US007620491B2

(12) United States Patent
Watanabe

(10) Patent No.: US 7,620,491 B2
(45) Date of Patent: Nov. 17, 2009

(54) APPARATUS FOR AND METHOD OF PERFORMING START PREPARATION FOR VEHICULAR ENGINE

(75) Inventor: Satoru Watanabe, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 465 days.

(21) Appl. No.: 11/526,629

(22) Filed: Sep. 26, 2006

(65) Prior Publication Data

US 2007/0073469 A1 Mar. 29, 2007

(30) Foreign Application Priority Data

Sep. 26, 2005 (JP) ............................ 2005-278564

(51) Int. Cl.
*G06F 19/00* (2006.01)
*F02N 17/00* (2006.01)
*F02D 45/00* (2006.01)

(52) U.S. Cl. ............ 701/113; 123/179.21; 123/142.5 E

(58) Field of Classification Search ............ 123/179.21, 123/179.15, 179.1, 142.5 E; 701/113, 35; 340/5.21, 5.31, 10.5, 426.1; 307/10.2, 10.6
See application file for complete search history.

(56) References Cited

U.S. PATENT DOCUMENTS 6,400,835 B1 6/2002 Lemelson et al.
6,707,373 B2 * 3/2004 Moreau ..................... 340/5.21

FOREIGN PATENT DOCUMENTS

| | | | | |
|---|---|---|---|---|
| CN | 1495658 | A | | 5/2004 |
| JP | 10-133594 | | | 5/1998 |
| JP | 2002-122060 | A | | 4/2002 |
| JP | 2004-340028 | A | | 12/2004 |
| JP | 2006-214358 | A | * | 8/2006 |
| KR | 2003-67069 | A | | 8/2003 |
| KR | 2004-29211 | A | | 4/2004 |

OTHER PUBLICATIONS

Chinese Office Action for Chinese Patent Application No. 200610159925.6, mailed Jul. 4, 2008, 4 pgs.

* cited by examiner

*Primary Examiner*—Hieu T Vo
(74) *Attorney, Agent, or Firm*—Foley & Lardner LLP

(57) ABSTRACT

Person authentication for determining if there is a specified driver is performed by biometrics or the like. Then when authenticated that there is a previously registered driver, it is predicted that the engine will be started, and prior to the driver operating the ignition key, operation of a fuel pump, or a heater fitted to an engine fuel injection valve, is commenced. Thereafter when the ignition key is operated by the driver, control shifts to normal control.

15 Claims, 5 Drawing Sheets

APPARATUS FOR AND METHOD OF PERFORMING START PREPARATION FOR VEHICULAR ENGINE

BACKGROUND OF THE INVENTION

1. Field of the Invention

The present invention relates to an apparatus for and a method of performing start preparation for a vehicular engine prior to starting the vehicular engine.

2. Description of the Related Art

In Japanese Unexamined Patent Publication No. 2004-340028 there is disclosed a start preparation system which detects; the opening/closing of a vehicle door, the insertion of a key into a key cylinder, a driver sitting down on a seat, fastening of a seat belt, or the like, and from these detection results, predicts starting of the engine, and in the case where starting of the engine is predicted, commences start preparation for the engine.

For this start preparation for the engine, power supply is started to a heater provided in a fuel injection valve which injects fuel into the engine.

However, when starting of the engine is predicted based on the opening/closing of the vehicle door or the like, then even for a boarding operation by a person other than the driver, starting of the engine is predicted. Consequently, in the conventional system, there is a problem in that start preparation for the engine is wastefully executed.

SUMMARY OF THE INVENTION

Therefore, the present invention has an object of more adequately performing start preparation for the engine.

In order to achieve this object, in the present invention, person authentication is performed, and in the case where a specified person is confirmed by the person authentication, start preparation for the engine is performed.

Other objects, features and advantages of this invention will become understood from the following description with reference to the accompanying drawings.

DESCRIPTION OF THE PREFERRED EMBODIMENT

Figure 1:
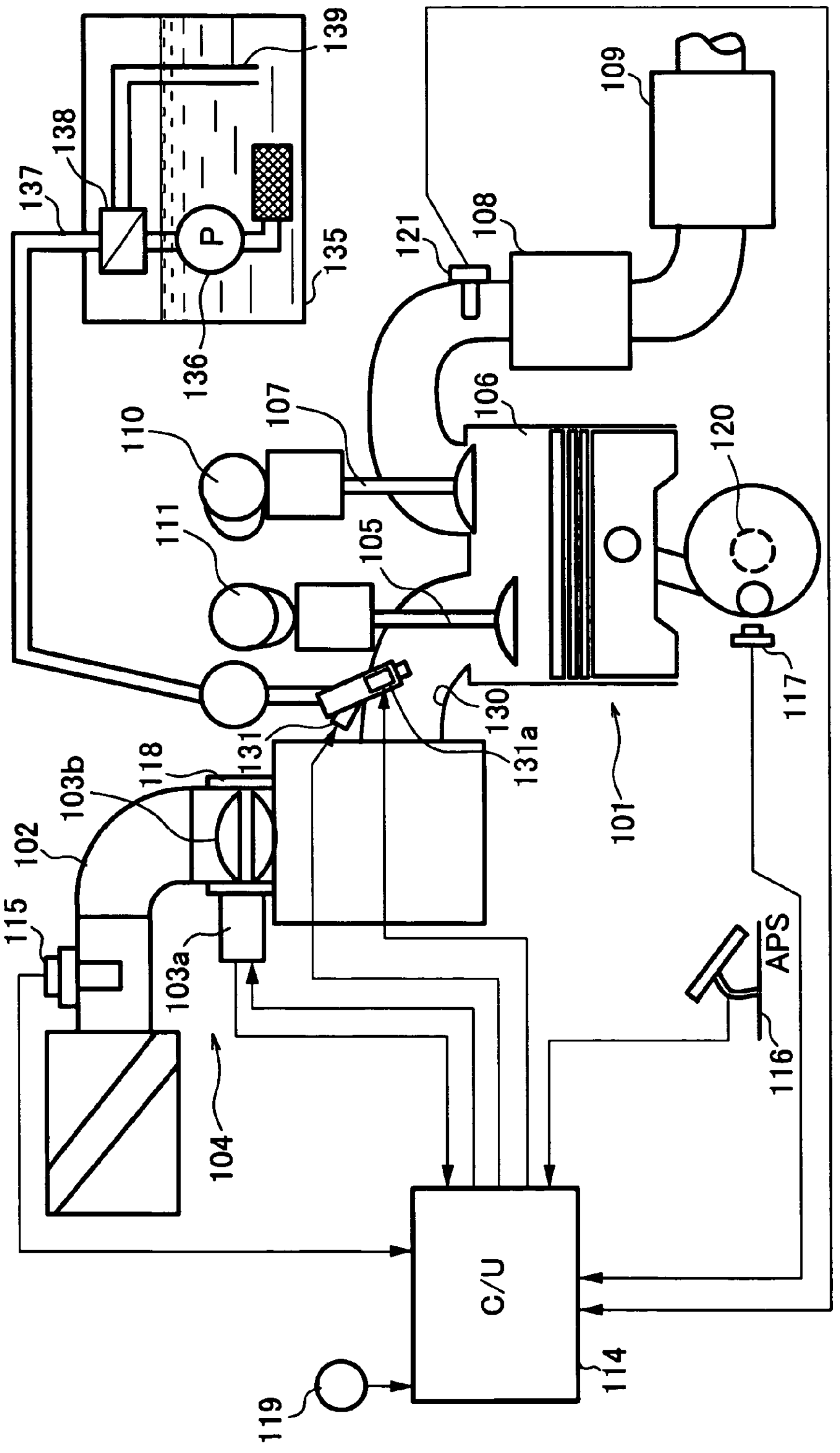
FIG. 1 is a diagrammatic view showing a vehicular engine to which the present invention is applied.

FIG. 1 is a diagrammatic view showing a vehicular engine to which the present invention is applied.

In FIG. 1, an electronically controlled throttle 104 is disposed in an inlet pipe 102 of an engine 101 (gasoline internal combustion engine). Electronically controlled throttle 104 is a device which drives a throttle valve 103*b* with a throttle motor 103*a*.

Air is drawn into a combustion chamber 106 via electronically controlled throttle 104 and an inlet valve 105.

A fuel injection valve 131 is provided in an inlet port 130 of each cylinder.

A heater 131*a* for heating the fuel is provided in fuel injection valve 131.

Fuel injection valve 131 is opened by an injection pulse signal from an engine control unit (ECU) 114, and injects fuel adjusted to a predetermined pressure, towards inlet valve 105.

The fuel inside combustion chamber 106 is ignited and burns by spark ignition from a spark plug (omitted from the figure).

The exhaust gas inside combustion chamber 106 is discharged to an exhaust pipe via an exhaust valve 107, and after being purified by a front catalyst 108 and a rear catalyst 109, is discharged to the atmosphere.

Inlet valve 105 and exhaust valve 107 are driven by cams respectively provided on camshafts 111 and 110.

In a fuel tank 135 which stores fuel (gasoline) of engine 101, an electric powered fuel pump 136 is incorporated. The fuel inside fuel tank 135 is force fed towards fuel injection valve 131 by fuel pump 136.

Part way along a fuel pipe 137 which communicates between a discharge opening of fuel pump 136 and fuel injection valve 131, a pressure regulator 138 is provided. Pressure regulator 138 returns fuel to fuel tank 135 via a return pipe 139 when the fuel pressure is above a predetermined pressure, to thereby adjust the pressure of the fuel force-fed to fuel injection valve 131, to the predetermined pressure.

Engine control unit 114 incorporates therein a microcomputer, and by arithmetic processing based on detection signals from various kinds of sensors, controls electronically controlled throttle 104, fuel injection valve 131, heater 131*a*, fuel pump 136, and the like.

Examples of the various kinds of sensors include; an accelerator opening sensor 116 which detects a depression amount (accelerator opening) of an accelerator pedal which the driver operates, an air flow meter 115 which detects an intake air quantity Q of engine 101, a crank angle sensor 117 which detects a rotation position of a crank shaft 120, a throttle sensor 118 which detects an opening TVO of throttle valve 103*b*, a water temperature sensor 119 which detects a cooling water temperature of engine 101, and a heater fitted air-fuel ratio sensor 121 which detects an air-fuel ratio based on an oxygen concentration in the exhaust gas on the upstream side of front catalyst 108.

Figure 2:
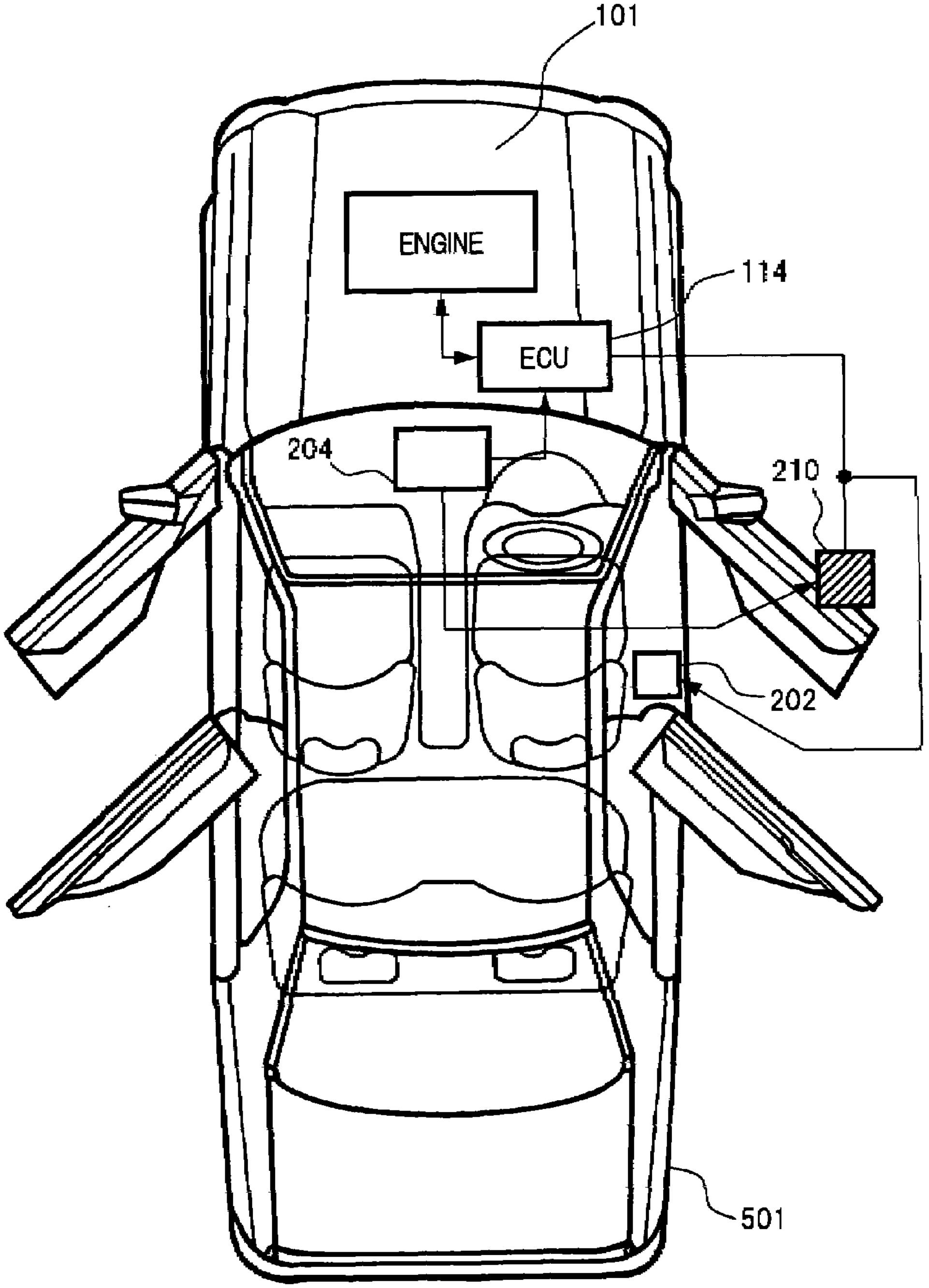
FIG. 2 is a diagrammatic view showing an anti-theft system for a vehicle in which the vehicular engine is installed.

Furthermore, as shown in FIG. 2, in a vehicle 501 in which the engine 101 is installed, there is provided a person authentication device 210.

Person authentication device 210 is a device which identifies whether or not a person who has accessed, is a specified person who has been previously registered, based on at least one of: biometrics, knowledge authentication, and property authentication.

Biometrics is where for example the person's retina, fingerprint, voice print, vein pattern etc., is identified, and there is provided an input/readout device for the retina, the fingerprint, the voice print, or the vein pattern etc.

Then, based on whether or not a retina, fingerprint, voice print, vein pattern etc., input/readout by input/readout device, matches with a previously recorded specified person's retina, fingerprint, voice print, vein pattern etc., person authentication is performed.

Knowledge authentication determines if a password comprising for example numbers and/or alphabet inputted by keyboard operation, matches with a previously recorded password, to thereby identify whether or not this is a previously recorded specified person.

Furthermore, in property authentication, whether or not a driver registration history card, a driving license, a health insurance certificate, a credit card, an employee certificate etc. is the property of a previously registered person, is determined by communicating with a wireless IC chip stored in these items of property, or from magnetic information recorded on these items of property, or by reading a bar code.

Here property authentication, knowledge authentication, and biometrics may be multiply combined, and a determination made as to whether or not the plurality of attributes match with personal attributes which are previously stored.

The authentication results of person authentication device 210 are output to engine control unit 114, a door controller 202, or the like.

Moreover, the above-mentioned person authentication device 210, engine control unit 114 and door controller 202 constitute an anti-theft system, which is able to operate so as to prevent theft of the vehicle by, for example, permitting start of the engine and permitting unlocking of the door, only in the case where it is authentically confirmed that a person who has made access is a specified person.

Furthermore, a result of person authentication is that, it is possible to use an auto driving position control which automatically moves the seat to an optimum driving position for the current driver, and to also use a control for automatically changing the maneuverability and the operating characteristics of vehicle 501 depending on the driving history and driving qualifications of the current driver.

Person authentication device 210 is provided on the outside of the door on the driver's seat side, or is provided near the driver's seat inside the vehicle.

The installation position for person authentication device 210 is determined based on whether or not person authentication is carried out by wireless communication, or whether or not direct access to the input/readout device is necessary. Furthermore, the installation position of person authentication device 210 is determined corresponding to whether locking of the door is controlled, or whether only prohibition of engine start is performed, by the person authentication.

Incidentally, engine control unit 114 has a function for predicting engine starting prior to commencing engine starting by operation of the ignition key, the start button or the like by the driver, and performing start preparation for the engine prior to engine starting.

Hereunder is a description of the start preparation control.

Figure 3:
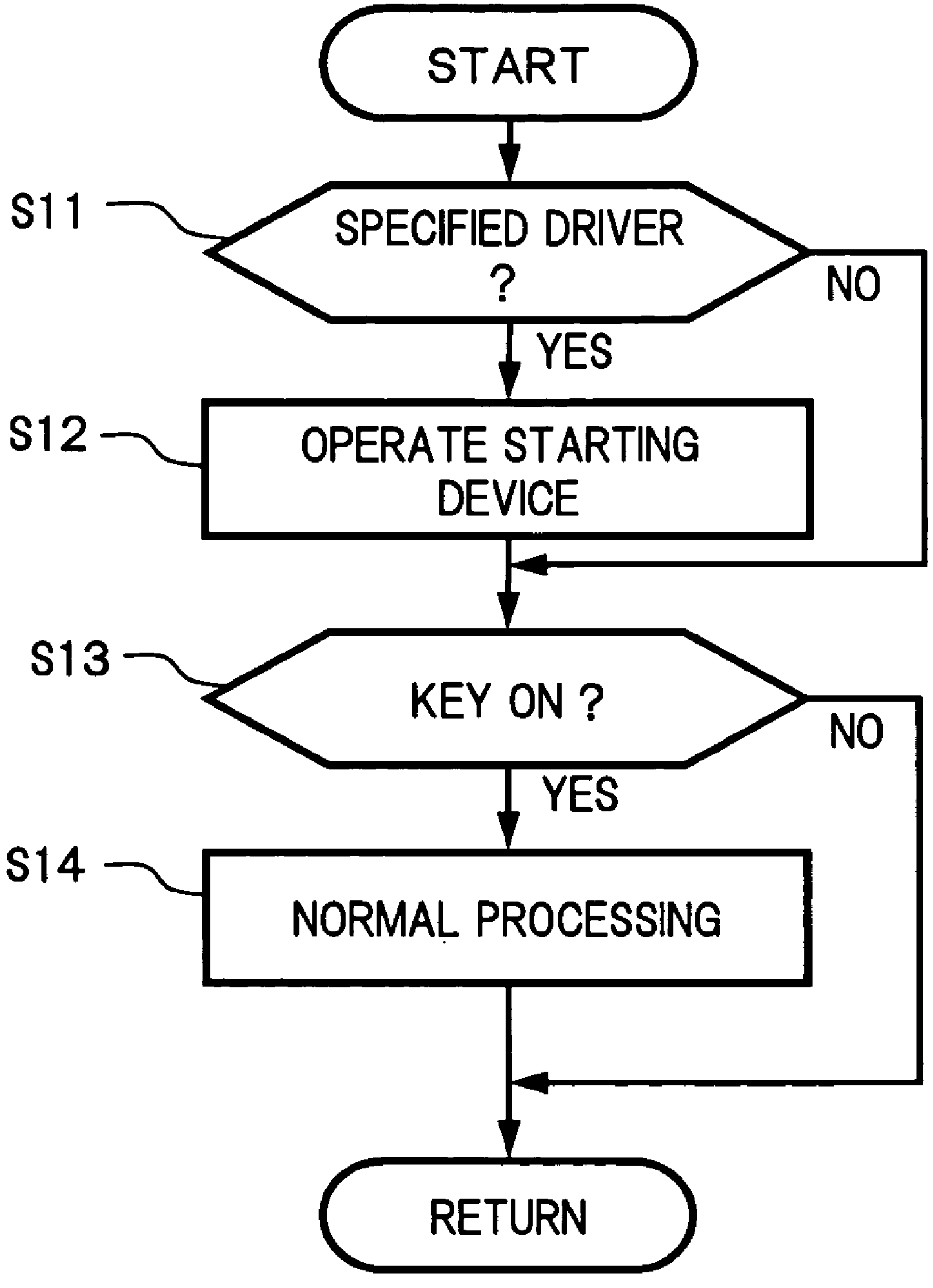
FIG. 3 is a flow chart showing a start preparation control in a first embodiment of the present invention.

The flow chart of FIG. 3 shows a first embodiment of the start preparation apparatus, and the respective steps show arithmetic processing by engine control unit 114.

In step S11, it is determined whether or not a specified person has been authenticated by person authentication device 210.

In the case where the specified person has been authenticated by person authentication device 210, it is determined that a previously registered driver has an intention to get in, and control proceeds to step S12.

In step S12, start preparation processing is performed for operating a previously set engine starting device, prior to an engine starting operation.

The engine starting device includes; heater 131*a* provided in fuel injection valve 131, heater for air-fuel ratio sensor 121, fuel pump 136, an electrically powered oil pump (not shown in the figure), and the like.

If the engine starting device is put into an operating condition prior to an actual operation to start the engine, engine starting can be commenced after optimum conditions for starting have been beforehand established, so that startability and operability immediately after starting can be improved.

More specifically, by previously switching on heater 131*a* and raising the heater temperature, atomization of the fuel spray from at the time of commencing starting can be promoted.

Furthermore, if heater for air-fuel ratio sensor 121 is previously switched on, the element temperature of air-fuel ratio sensor 121 can be raised to close to the activation temperature prior to commencing engine start, so that the starting of the air-fuel ratio feed back control can be advanced.

Moreover, if fuel pump 136 and the electric oil pump are operated beforehand, the pressure of the fuel and that of the oil can be raised to close to the respective target pressures before actual starting of the engine, so that formation of the fuel spray, circulation of the oil and the like, can be performed well from initial starting.

The engine starting device is not limited to those described above, and provided this is a device related to starting of the engine, this may include various kinds of devices which require time until normal operating conditions are attained, or various kinds of devices which require time until conditions of the engine are at an optimum.

Furthermore, the device which is to be operated from before engine starting can be selected from a detection value of temperature or pressure.

For example, in the case where at the time of restarting immediately after engine stop, conditions are such that the engine temperature is high, the heater can be excluded from the engine starting devices.

Next in step S13, it is determined whether or not the ignition key (or engine start switch) is ON.

Then if the ignition key is ON, control proceeds to step 14, and normal control of the various kinds of devices including the engine starting device is commenced.

In the case where the ignition key is not ON, control bypasses step S14, and the current routine is ended.

Consequently, in the case where operation of an engine starting device is commenced based on person authentication, the engine starting device is maintained in an operating state until the ignition key is turned ON. On the other hand, in the case where the ignition key is turned ON without person authentication, normal control is commenced immediately without commencing start preparation.

A proviso is that in the case where the ignition key is not turned ON even after a predetermined time has elapsed from after commencement of operating the starting device, operation of the starting device is stopped.

Furthermore operation of the engine starting device can also be temporarily stopped, at a point in time when the temperature or pressure has increased to a predetermined value.

Moreover, in the case where starting of the engine is permitted for the condition where it is authenticated that there is a specified person, the engine will not start even if the ignition key is turned ON, without authentication of the specified person.

In the above manner, if the engine starting device is put into an operation before engine starting in the case where it is determined by person authentication device 210 that there is the specified person and an intention of the specified person to get in is confirmed, then engine start preparation can be performed corresponding to only the intention to get in of the previously registered occupant.

Consequently, for example in the case where a person other than the specified driver inappropriately gets in, or in the case where a person other than the specified driver gets in in order to for example deposit and withdraw luggage or the like, wasteful start preparation for the engine can be avoided.

A device for optionally canceling the commencement of start preparation for the engine, based on the person authentication, may be provided.

Incidentally, if person authentication device 210 or the engine control unit 114 is continually standing by in an ON condition during parking, the power consumption of vehicle 501 during parking becomes significant.

Figure 4:
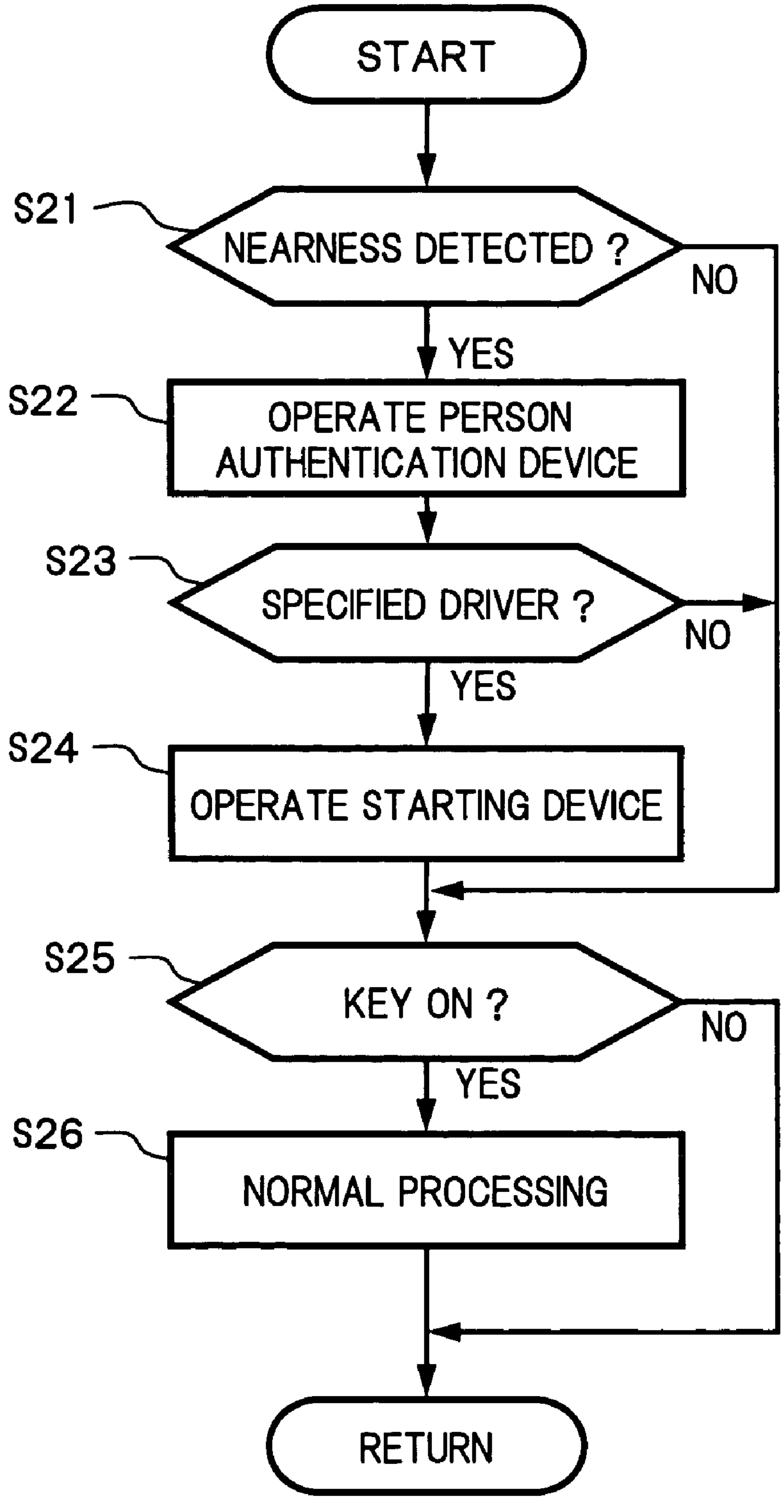
FIG. 4 is a flow chart showing a start preparation control in a second embodiment of the present invention.

Therefore, in a second embodiment shown in the flow chart of FIG. 4, the nearness of a person to vehicle 501 is detected, and when a person is near, energizing power to person authentication device 210 and engine control unit 114 is turned on.

Moreover, under conditions where a person is not near vehicle 501, person authentication device 210 and engine control unit 114 are maintained in the OFF condition.

In particular, if vehicle 501 is provided with an anti-theft system which detects the nearness of a suspicious person to vehicle 501, and gives an alarming or warning, the nearness detection function in the anti-theft system can be appropriated.

In the second embodiment, as shown in FIG. 2, a movable body detection device 204 is provided for detecting a movable body in the vicinity of vehicle 501 by means of for example a microwave sensor or the like, and controlling turning on of power to person authentication device 210 and engine control unit 114.

Furthermore, as shown in the flow chart of FIG. 4, engine start preparation control is executed.

In the flow chart of FIG. 4, the processing of steps S21 and 22 is executed by movable body detection device 204, and the processing of step S23 and thereafter is executed by engine control unit 114.

In the flow chart of FIG. 4, in step S21 it is determined if a person has been detected near vehicle 501.

Then, if a person is detected near vehicle 501, control proceeds to step S22.

In step S22, energizing power to person authentication device 210 and engine control unit 114 is turned on, giving a condition for performing person authentication and performing engine start preparation control based on the results of the person authentication.

In step S23 and thereafter, similarly to step S11 and thereafter in the flow chart of FIG. 3, the engine control unit 114 commences engine start preparation based on the person authentication.

Figure 5:
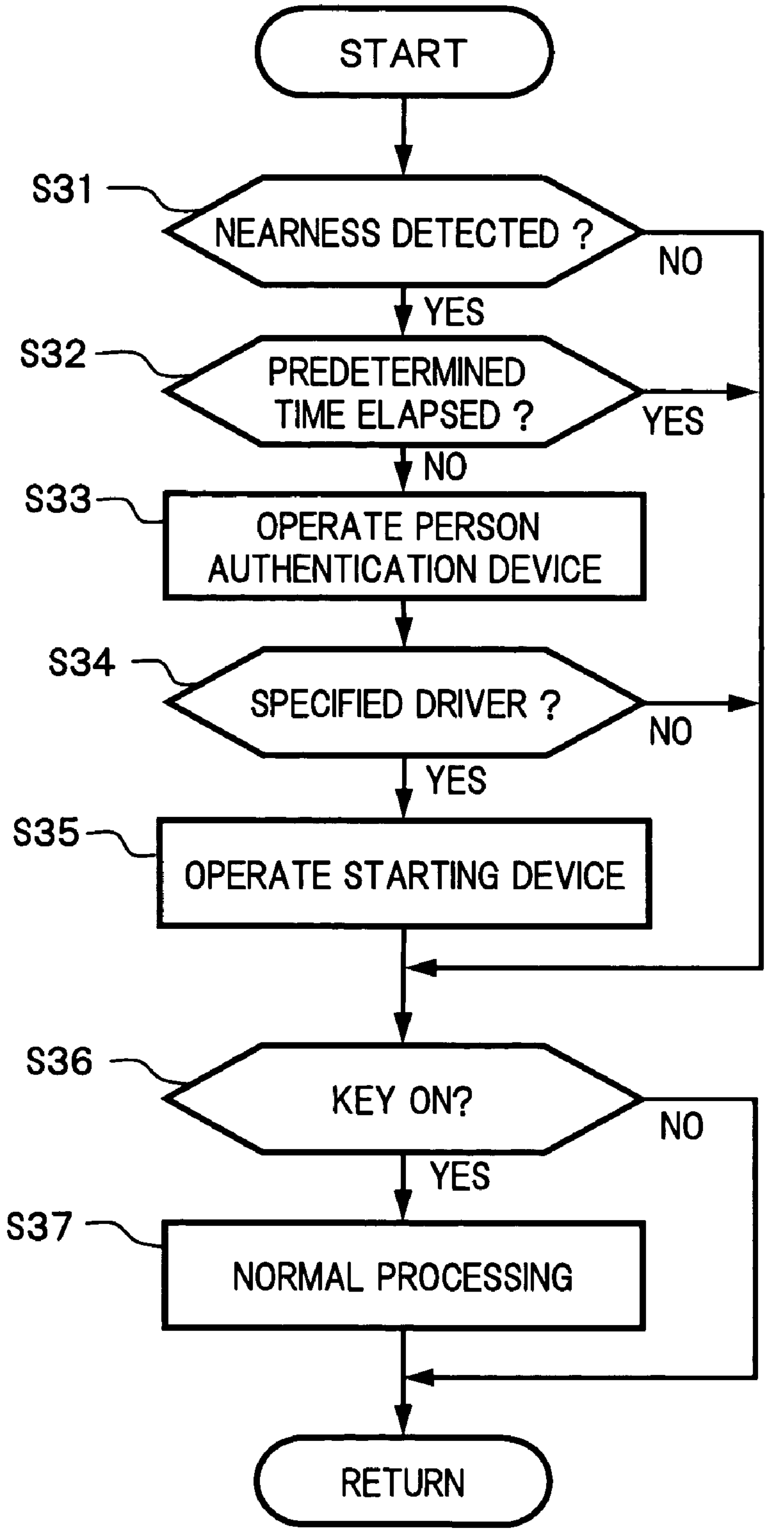
FIG. 5 is a flow chart showing a start preparation control in a third embodiment of the present invention.

The flow chart of FIG. 5 shows a third embodiment with an additional further improvement added to the control for turning on power to person authentication device 210 and engine control unit 114, by means of movable body detection device 204.

Here, movable body detection device 204 executes the processing of steps S31 to 33, and engine control unit 114 executes the processing of step S34 and thereafter.

In the flow chart of FIG. 5, in step S31, it is determined if a person has been detected near vehicle 501.

Then, if a person is detected near vehicle 501, control proceeds to step S32, and it is determined if it is within a predetermined time from detecting the person near vehicle 501.

Here, if it is within a predetermined time from detecting the person near vehicle 501, control proceeds to step S33, and the electric power is turned on to person authentication device 210 and engine control unit 114.

Next in step S34, whether or not person authentication has been performed by person authentication device 210 which is turned on, is determined by engine control unit 114 which has similarly been turned on.

If person authentication has been performed, control proceeds to step S35, and engine control unit 114 executes start preparation control which operates the engine starting device prior to engine starting.

Consequently, if a regular occupant normally approaches the vehicle in order to get into vehicle 501, and person authentication is performed as is, similar processing to that of the second embodiment is performed.

On the other hand, in step S32, in the case where it is determined that a predetermined time has elapsed from detecting a person near vehicle 501, step S33 is bypassed, and control proceeds to step S36, so that person authentication device 210 and the engine control unit 114 return to the inactive state (power cut-off state).

That is, whoever approaches the vehicle, in the case where even after a predetermined time has elapsed person authentication has not been performed, it is judged that an irrelevant person has walked past vehicle 501, or a person who is not registered as the object of person authentication has come near.

Consequently, the situation where person authentication device 210 and engine control unit 114 are left in the turned on state even when people simply passing in the vicinity of the vehicle who are not the driver of vehicle 501, are detected by movable body detection device 204, can be avoided.

When movable body detection device 204 detects a movable body, and a set state of an anti-theft system which gives an alarming or warning is released by remote control or the like, the power to person authentication device 210 and engine control unit 114 can be turned on.

Furthermore, when after turning on power to person authentication device 210 and engine control unit 114 by detection of a movable body, a specified person is not authenticated even after lapse of a predetermined time, a warning is issued, and when the specified person is authenticated in a predetermined time, the start preparation for the engine can be executed.

The entire contents of Japanese Patent Application No. 2005-278564, filed Sep. 26, 2005 are incorporated herein by reference.

While only selected embodiments have been chosen to illustrate the present invention, it will be apparent to those skilled in the art, from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

I claim:

1. An apparatus for performing start preparation for a vehicular engine, comprising:

means for performing person authentication; and means for commencing electric power supply to an electric heater provided in the engine prior to starting the engine as start preparation for the engine, when a specified person is authenticated by the means for performing person authentication.

2. An apparatus for performing start preparation for a vehicular engine, comprising:

a first section for performing person authentication; and a second section for commencing electric power supply to an electric heater provided in the engine prior to start the engine, as start preparation for the engine, when a specified person is authenticated by the first section for performing person authentication.

3. An apparatus for performing start preparation for a vehicular engine according to claim 2 wherein,
   the first section for performing person authentication performs person authentication based on a driving license.

4. An apparatus for performing start preparation for a vehicular engine according to claim 2, further comprising:
   a third section for stopping operation of the second section for commencing electric power supply to the electric heater, when an operating time of the second section exceeds a threshold value.

5. An apparatus for performing start preparation for a vehicular engine according to claim 2, further comprising:
   a fourth section for permitting starting of the engine, when a specified person is authenticated by the first section for performing person authentication.

6. An apparatus for performing start preparation for a vehicular engine according to claim 2, further comprising:
   a fifth section for detecting a movable body in the vicinity of a vehicle; and
   a sixth section for supplying electric power to the first section for performing person authentication and the second section for commencing electric power supply to the electric heater, when the movable body in the vicinity of the vehicle is detected.

7. An apparatus for performing start preparation for a vehicular engine according to claim 6, further comprising:
   a seventh section for measuring a time from after supplying electric power to the first section for performing person authentication and the second section for commencing electric power supply to the electric heater; and
   an eighth section for cutting off power supply to the first section for performing person authentication and the second section for commencing electric power supply to the electric heater, when the time exceeds a threshold value.

8. An apparatus for performing start preparation for a vehicular engine according to claim 2, further comprising:
   a ninth section for detecting a movable body in the vicinity of a vehicle;
   a tenth section for outputting a warning, when the movable body is detected;
   an eleventh section for canceling operation of the tenth section for outputting a warning; and
   a twelfth section for supplying electric power to the first section for performing person authentication and the second section for commencing electric power supply to the electric heater, when operation of the tenth section for outputting a warning is cancelled.

9. A method of performing start preparation for a vehicular engine, comprising the steps of:
   performing start preparation; and
   commencing electric power supply to an electric heater provided in the engine prior to starting the engine, as start preparation for the engine, when a specified person is authenticated.

10. A method of performing start preparation for a vehicular engine according to claim 9 wherein,
   performing person authentication comprises the following steps of:
   reading information of a driving license; and
   performing person authentication based on the information read.

11. A method of performing start preparation for a vehicular engine according to claim 9, further comprising the steps of:
   measuring a time while the start preparation is performed;
   determining whether or not the time exceeds a threshold value; and
   stopping performance of the start preparation, when the time exceeds the threshold value.

12. A method of performing start preparation for a vehicular engine according to claim 9, further comprising the step of:
   permitting starting of the engine, when the specified person is authenticated.

13. A method of performing start preparation for a vehicular engine according to claim 9, further comprising the following steps of:
   detecting a movable body in the vicinity of a vehicle; and
   permitting execution of the person authentication and execution of the start preparation, when the movable body is detected in the vicinity of the vehicle.

14. A method of performing start preparation for a vehicular engine according to claim 13, further comprising the following steps of:
   measuring a time from after permitting execution of the person authentication and execution of the start preparation; and
   canceling execution of the person authentication and execution of the start preparation, when the time exceeds a threshold value.

15. A method of performing start preparation for a vehicular engine according to claim 9, further comprising the following steps of:
   detecting a movable body in the vicinity of a vehicle;
   outputting a warning, when the movable body is detected;
   canceling output of the warning; and
   permitting execution of the person authentication and execution of the start preparation, when output of the warning is cancelled.

* * * * *

UNITED STATES PATENT AND TRADEMARK OFFICE

CERTIFICATE OF CORRECTION

PATENT NO. : 7,620,491 B2
APPLICATION NO. : 11/526629
DATED : November 17, 2009
INVENTOR(S) : Satoru Watanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Fourteenth Day of December, 2010

David J. Kappos

*Director of the United States Patent and Trademark Office*